(12) United States Patent
Von-Doehren et al.

(10) Patent No.: US 12,493,018 B2
(45) Date of Patent: Dec. 9, 2025

(54) LOAD ADAPTER FOR IMPROVED PACKING BED STABILITY

(71) Applicant: AGILENT TECHNOLOGIES, INC., Santa Clara, CA (US)

(72) Inventors: Norwin Rolf Leonhard Von-Doehren, Santa Clara, CA (US); Peter Van-Keulen, Santa Clara, CA (US); Roman Van-Keulen, Santa Clara, CA (US)

(73) Assignee: AGILENT TECHNOLOGIES, INC., Santa Clara, CA (US)

( * ) Notice: Subject to any disclaimer, the term of this patent is extended or adjusted under 35 U.S.C. 154(b) by 113 days.

(21) Appl. No.: 18/339,348

(22) Filed: Jun. 22, 2023

(65) Prior Publication Data
US 2023/0417710 A1  Dec. 28, 2023

Related U.S. Application Data

(60) Provisional application No. 63/355,895, filed on Jun. 27, 2022.

(51) Int. Cl.
*G01N 30/60* (2006.01)
*G01N 30/02* (2006.01)

(52) U.S. Cl.
CPC ..... *G01N 30/6017* (2013.01); *G01N 30/6026* (2013.01); *G01N 2030/027* (2013.01)

(58) Field of Classification Search
None
See application file for complete search history.

(56) References Cited

U.S. PATENT DOCUMENTS

| | | | | |
|---|---|---|---|---|
| 3,966,609 A | * | 6/1976 | Godbille | B01D 15/22 96/105 |
| 4,451,364 A | * | 5/1984 | Higgins | G01N 30/6026 285/109 |
| 4,627,918 A | * | 12/1986 | Saxena | B01D 15/14 210/656 |
| 4,732,687 A | * | 3/1988 | Muller | G01N 30/603 95/82 |
| 4,737,292 A | * | 4/1988 | Ritacco | B01D 15/20 95/84 |
| 4,787,971 A | * | 11/1988 | Donald | B01D 15/22 436/178 |
| 5,013,433 A | * | 5/1991 | Shalon | G01N 30/6017 96/105 |

(Continued)

FOREIGN PATENT DOCUMENTS

| | | |
|---|---|---|
| DE | 102004023427 A1 | 12/2005 |
| DE | 112012002247 | 4/2014 |

(Continued)

OTHER PUBLICATIONS

English translation of the Search Report for Germany Application No. 102023116874.6, mailed Apr. 25, 2024, 6 pages.

*Primary Examiner* — Matthew W Jellett

(57) ABSTRACT

In some examples, a load adapter may include a body including an elongated shaft that includes an inlet passage that is in fluid communication with at least one outlet hole. The at least one outlet hole may be dimensioned to provide an opening area that is between approximately 5% to approximately 90% of a face of the body.

18 Claims, 8 Drawing Sheets

(56) References Cited

U.S. PATENT DOCUMENTS

| | | | | |
|---|---|---|---|---|
| 5,169,522 A * | 12/1992 | Shalon | ............... | B01D 15/08 210/241 |
| 5,919,361 A * | 7/1999 | Moran | ............... | G01N 30/6021 210/656 |
| 6,440,301 B1 * | 8/2002 | Dobos | ............... | B01D 15/22 210/450 |
| 6,527,951 B1 * | 3/2003 | Tuvim | ............... | B01D 15/22 210/450 |
| 7,021,134 B2 * | 4/2006 | Dykas | ............... | G01F 1/6847 73/204.22 |
| 7,404,893 B2 * | 7/2008 | DeMarco | ............... | G01N 30/6091 210/656 |
| 7,909,367 B2 * | 3/2011 | Plant | ............... | G01N 30/6034 285/342 |
| 8,696,902 B2 * | 4/2014 | Ford | ............... | G01N 30/6039 73/61.53 |
| 9,032,819 B2 * | 5/2015 | Nichols | ............... | G01N 1/2035 73/863.86 |
| 9,950,278 B1 * | 4/2018 | Zelechonok | ............... | G01N 30/6047 |
| 10,092,858 B2 * | 10/2018 | Ritchie | ............... | B01D 15/22 |
| 11,097,208 B2 * | 8/2021 | Yamanaka | ............... | B01D 15/10 |
| 2005/0011835 A1 * | 1/2005 | Henderson | ............... | B01D 15/22 210/656 |
| 2009/0230045 A1 * | 9/2009 | Kaneko | ............... | G01N 30/6091 210/198.2 |
| 2010/0154207 A1 * | 6/2010 | Ford | ............... | G01N 30/6004 29/700 |
| 2014/0196524 A1 * | 7/2014 | Hirmer | ............... | G01N 30/6039 73/61.53 |
| 2023/0264118 A1 * | 8/2023 | Von Doehren | ............... | B01D 15/22 210/656 |

FOREIGN PATENT DOCUMENTS

| | | | | |
|---|---|---|---|---|
| GB | | 2491169 A | * 11/2012 | ............ B01D 15/22 |
| WO | | 2022072213 A1 | 4/2022 | |

* cited by examiner

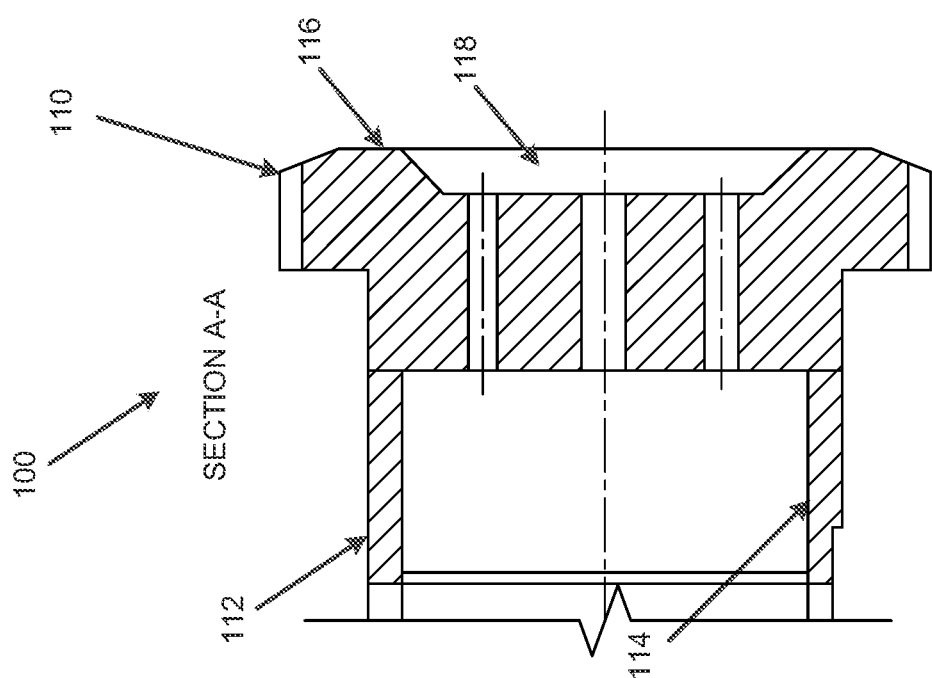
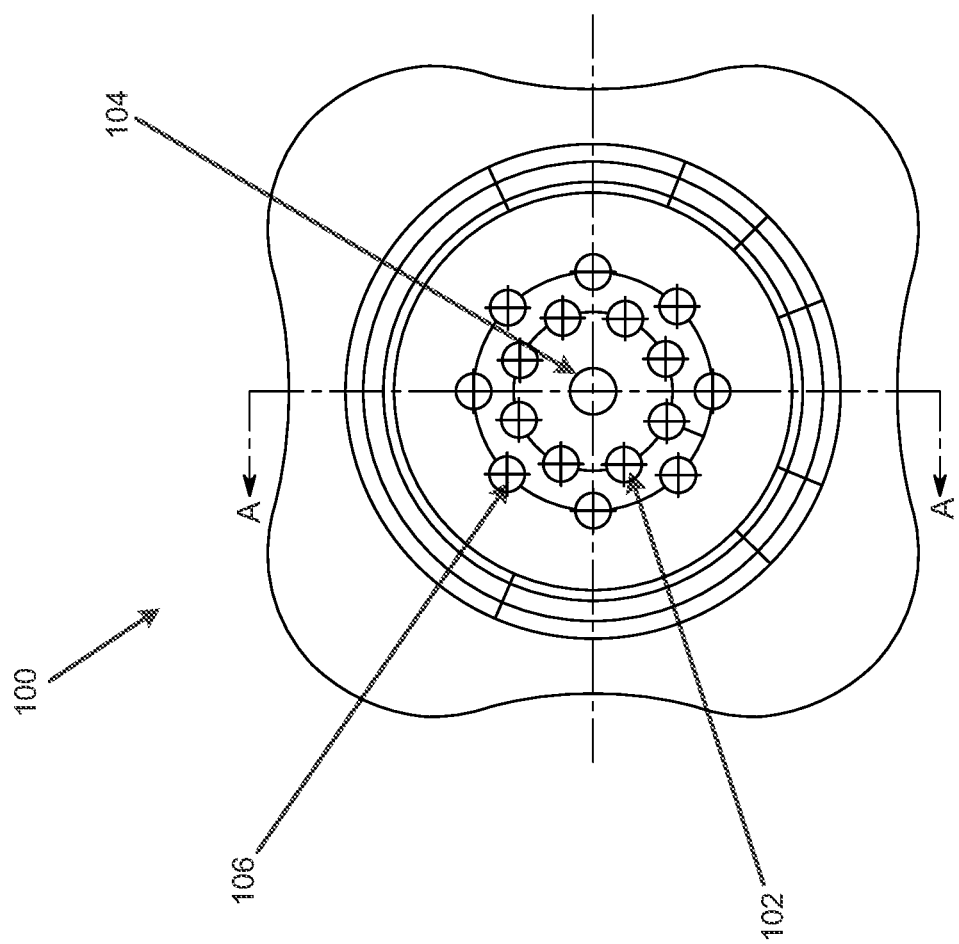
FIG. 1B
FIG. 1A

LOAD ADAPTER FOR IMPROVED PACKING BED STABILITY

PRIORITY

This application claims priority to commonly assigned and U.S. Provisional Application Ser. No. 63/355,895, filed Jun. 27, 2022, the disclosure of which is hereby incorporated by reference in its entirety.

BACKGROUND

With respect to High-performance liquid chromatography (HPLC) columns, a guard column may include a frit on each side pressed into a cartridge tube. The design of the column and related components may impact the quality of a packing bed.

BRIEF DESCRIPTION OF DRAWINGS

Features of the present disclosure are illustrated by way of example and not limited in the following figure(s), in which like numerals indicate like elements, in which:

FIGS. 1A and 1B respectively illustrate a front view of a first embodiment of a load adapter, and a side sectional view taken generally along section A-A of FIG. 1A, in accordance with an example of the present disclosure;

DETAILED DESCRIPTION

Figure 2:
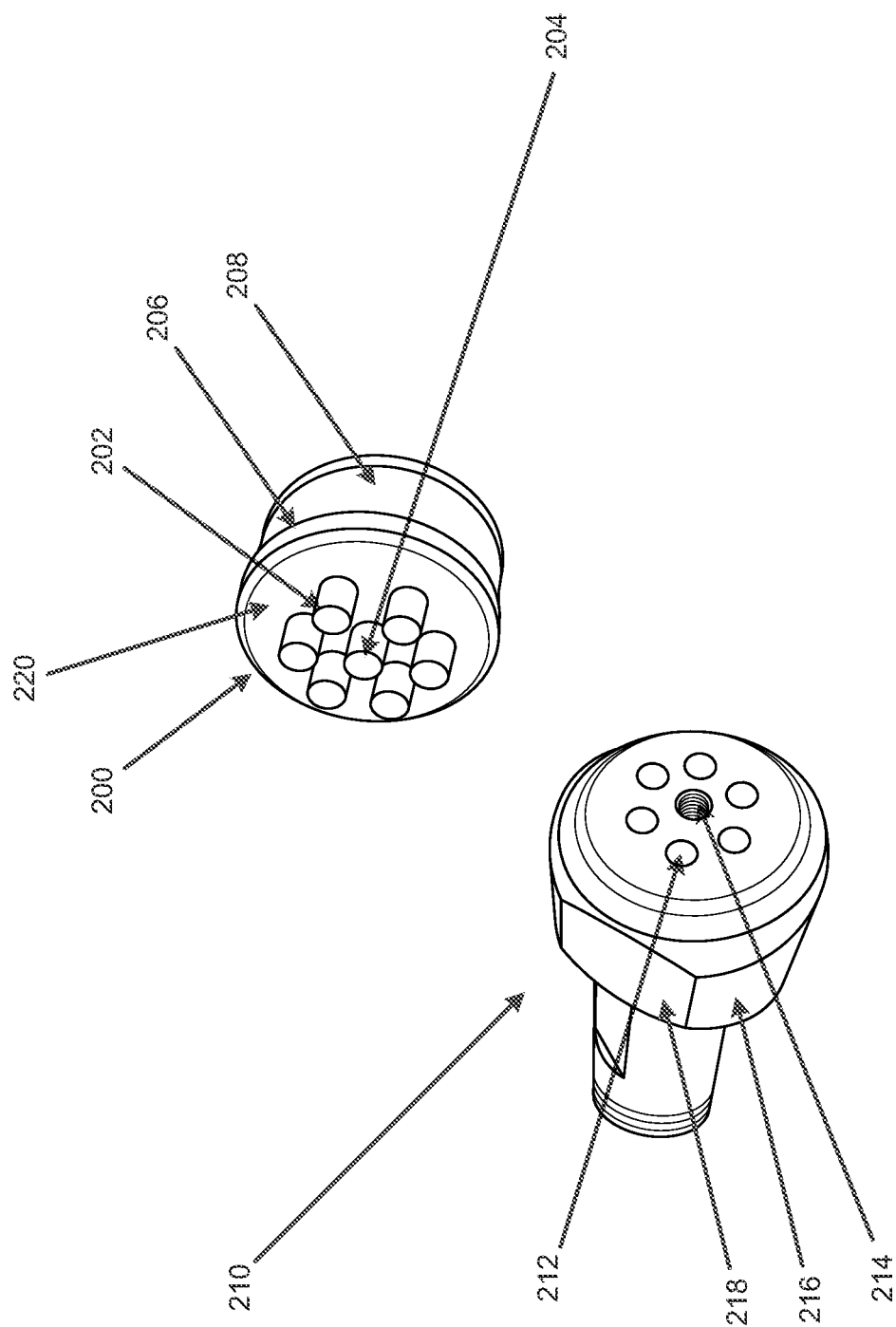
FIG. 2 illustrates an isometric view of a second embodiment of a load adapter, and an isometric view of a plug for an HPLC column tube, in accordance with an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, and the term "including" means including but not limited to. The term "based on" means based at least in part on.

With respect to High-performance liquid chromatography (HPLC) columns, a guard column may include a frit on each side pressed into a cartridge tube. In this regard, a load adapter as disclosed herein may be utilized for supporting the frit while filling the guard cartridge. The load adapter as disclosed herein may include one or more holes that are distributed over a cross-section of the tube/frit. The one or more holes in the load adaptor may include a diameter such that the load adaptor creates a homogeneous flow across the tube/packing bed, as well as a denser and more homogenous packing bed. Yet further, the one or more holes in the load adapter as disclosed herein may provide lifetime and packing bed stability for relatively shorter guard columns. For example, the one or more holes may provide on the order of a 5% to 90% opening area to prevent the load adapter from being a restriction in a flow path during initial stages of loading a column.

With respect to the column tube, a frit may be pressed into each side of the column tube. The frit may be placed before loading (e.g., a filling process). The frit may be supported by the load adapter as the loading may be performed under high hydrodynamic flow and at high pressures. After the column is filled, the pump may be stopped, and a specified time may elapse to release pressure. During this time, the packing bed may resettle and the forces of the packing bed on the outlet frit may reduce. For example, the forces of the packing bed may reduce sufficiently so that an end fitting may be released and exchanged with the final operation end fitting. For adding the inlet load frit, some media of the tube may be scooped before pressing in the frit. If the scooping is performed at a depth that is less deep than the thickness of the frit, the packing bed may be compressed while pressing in the frit. The compression of the packing bed may increase packing bed stability.

The load adapter as disclosed herein may ensure high pressure loading at the early stage of column bed formation. The load adapter may enable high liquid flow during this stage. In one example, the load adapter may include a single large hole, or a plurality (e.g., five, seven, etc., smaller holes) to prevent the load adapter from being a restriction in the flow path during the initial stages of loading a column.

For the load adapter as disclosed herein, the holes (or the relatively large hole) may allow liquid to readily drain from the column. In order to assure that the slurry does not run out of the column immediately after it is poured into a barrel, the hole (or holes) may be initially blocked by a plug as disclosed herein. The plug may be removed as soon as the loading is commenced.

According to examples disclosed herein, a load adapter may include a body including an elongated shaft that includes an inlet passage that is in fluid communication with at least one outlet hole. The at least one outlet hole may be dimensioned to provide an opening area that is between approximately 5% to approximately 90% of a face of the body.

For the load adapter described above, the at least one outlet hole may include seven holes that include a central hole and six holes disposed in a circular pattern around the central hole.

For the load adapter described above, the at least one outlet hole may include a central hole and a plurality of holes disposed in a circular pattern around the central hole. In this regard, the central hole may be at least partially internally threaded. Further, the at least one outlet hole may include a further plurality of holes disposed in a circular pattern around the plurality of holes.

The load adapter described above may further include a plug insertable within the load adapter to close the at least one outlet hole. In this regard, the plug may include at least one complementary protrusion that is insertable in the at least one outlet hole to close the at least one outlet hole.

For the load adapter described above, the face of the body may include a recessed portion that includes the at least one outlet hole.

The load adapter described above may further include a circular side wall including at least one flat portion.

According to examples disclosed herein, a load adapter may include a body including an inlet passage that is in fluid communication with at least one outlet hole. The at least one outlet hole may be dimensioned to provide an opening area that is between approximately 5% to approximately 90% of a face of the body.

For the load adapter described above, the inlet passage may be partially formed within the body.

For the load adapter described above, the at least one outlet hole may include a central hole and a plurality of holes disposed in a circular pattern around the central hole.

The load adapter described above may further include a plug insertable within the load adapter to close the at least one outlet hole. The plug may include at least one complementary protrusion that is insertable in the at least one outlet hole to close the at least one outlet hole.

The load adapter described above may further include a side wall including a plurality of flat portions.

According to examples disclosed herein, a load adapter may include a body including an elongated shaft that includes an inlet passage that is in fluid communication with a plurality of outlet openings. The plurality of outlet openings may be dimensioned to provide an opening area that is between approximately 5% to approximately 90% of a face of the body.

For the load adapter described above, the plurality of outlet openings may include a central opening and a plurality of openings disposed in a circular pattern around the central opening.

The load adapter described above may further include a plug insertable within the load adapter to close the plurality of outlet openings.

For the load adapter described above, the plug may include a plurality of complementary protrusions that are insertable in the plurality of outlet openings to close the plurality of outlet openings.

According to examples disclosed herein, a plug may include a body including at least one protrusion that is insertable in at least one complementary outlet hole of a load adapter to close the at least one outlet hole.

For the plug described above, the body may include a first diameter portion including the at least one protrusion, and a second diameter portion extending from the first diameter portion. Further, a diameter of the second diameter portion may be less than a diameter of the first diameter portion.

For the plug described above, the at least one protrusion may include a central protrusion and a plurality of protrusions disposed in a circular pattern around the central protrusion. The at least one protrusion may include a plurality of further protrusions disposed in a circular pattern around the plurality of protrusions.

For the plug described above, the at least one protrusion may be dimensioned to provide a closing area that is between approximately 5% to approximately 90% of a face of the body.

FIGS. 1A and 1B respectively illustrate a front view of a first embodiment of a load adapter 100, and a side sectional view taken generally along section A-A of FIG. 1A, in accordance with an example of the present disclosure.

Referring to FIG. 1A, the load adapter 100 may include, as shown, a body 110 including an elongated shaft 112 that includes an inlet passage 114 that is in fluid communication with at least one outlet hole 102 (also referred to herein as holes 102). The at least one outlet hole 102 may be disposed closer to a central hole 104. In the example of FIG. 1A, the load adapter 100 may include eight holes 102. However, as disclosed herein, the load adapter 100 may include a single hole or any number of holes that provide on the order of a 5% to 90% opening area to prevent the load adapter from being a restriction in a flow path during initial stages of loading a column. The load adapter 100 may further include holes 106 that are disposed at a greater radial distance away from the central hole 104. In the example of FIG. 1A, the load adapter 100 may include eight holes 106.

Referring to FIG. 1B, face 116 of the body 110 may include a recessed portion 118 that includes the at least one outlet hole 102.

FIG. 2 illustrates an isometric view of a second embodiment of a load adapter 210, and an isometric view of a plug 200 for an HPLC column tube, in accordance with an example of the present disclosure.

Referring to FIG. 2, the load adapter 210 is illustrated as including six holes 212, central hole 214, and none of the holes 106 as shown in FIG. 1A. The central hole 214 may be at least partially internally threaded. The load adapter 210 may further include a circular side wall 216 including at least one flat portion 218. The flat portion 218 may be utilized, for example, for alignment, installation, and other such purposes for the load adapter 210.

The plug 200 may be insertable within the load adapter 210 to close the holes 212 and 214. In the example of FIG. 2, the plug 200 may include six protrusions 202 insertable into the holes 212, and a central protrusion 204 insertable into the hole 214. In order to assure that the slurry does not run out of the column immediately after it is poured into a barrel, the holes 212 and 214 may be initially blocked by the plug 200. The plug 200 may be removed as soon as the loading is commenced.

Figure 3B:
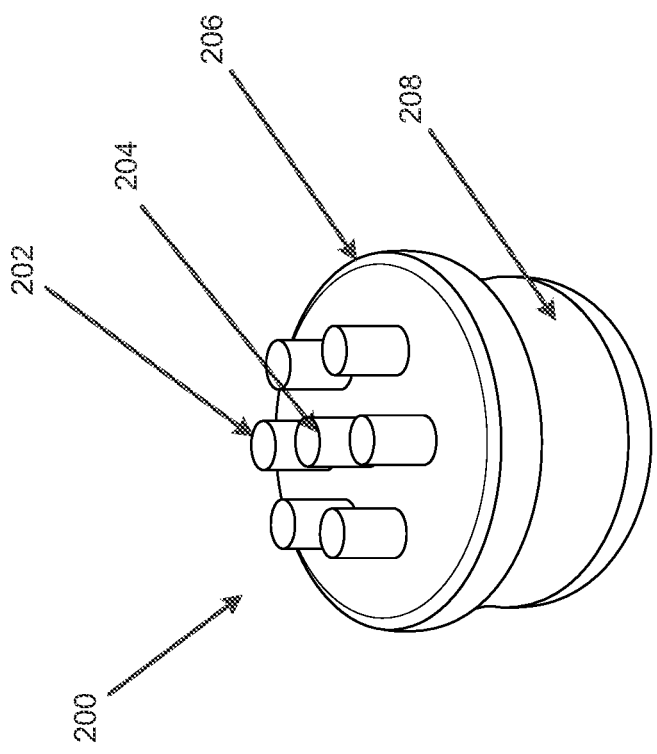
FIGS. 3A and 3B respectively illustrate an internal view of the load adapter and plug of FIG. 2, in accordance with an example of the present disclosure.

The plug 200 may include a body that includes a first diameter portion 206 including the at least one protrusion, and a second diameter portion 208 extending from the first diameter portion. Further, as shown in FIGS. 2 and 3B, a diameter of the second diameter portion may be less than a diameter of the first diameter portion. In the example of FIGS. 2 and 3B, the at least one protrusion may include a central protrusion 204 and a plurality of protrusions 202 disposed in a circular pattern around the central protrusion. The at least one protrusion may include a plurality of further protrusions (not shown) disposed in a circular pattern around the plurality of protrusions 202 (e.g., usable with the load adapter 100 of FIG. 1A). The at least one protrusion may be dimensioned to provide a closing area that is between approximately 5% to approximately 90% of a face 220 of the body.

The load adapter 210 may be used in combination with the plug 200 while adding solvent. The plug 200 may seal the load adapter 210 such that the slurry is stabilized until the barrel is closed. Thereafter, the plug 200 may be removed, and the pumps may be started as needed.

Figure 3A:
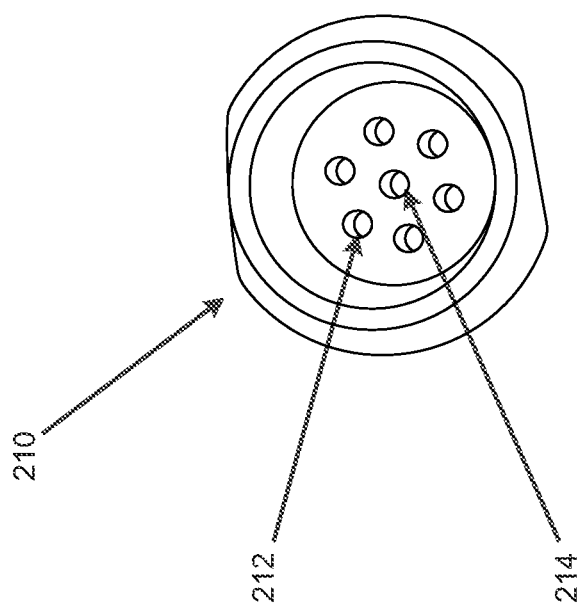

FIGS. 3A and 3B respectively illustrate an internal view of the load adapter 210, and another isometric view of the plug 200, in accordance with an example of the present disclosure.

Referring to FIG. 3A, the load adapter 210 is illustrated as including six holes 212, central hole 214, and none of the holes 106 as shown in FIG. 1A. Referring to FIG. 3B, the plug 200 is shown as including six protrusions 202 insertable into the holes 212, and the central protrusion 204 insertable into the hole 214.

Figure 4:
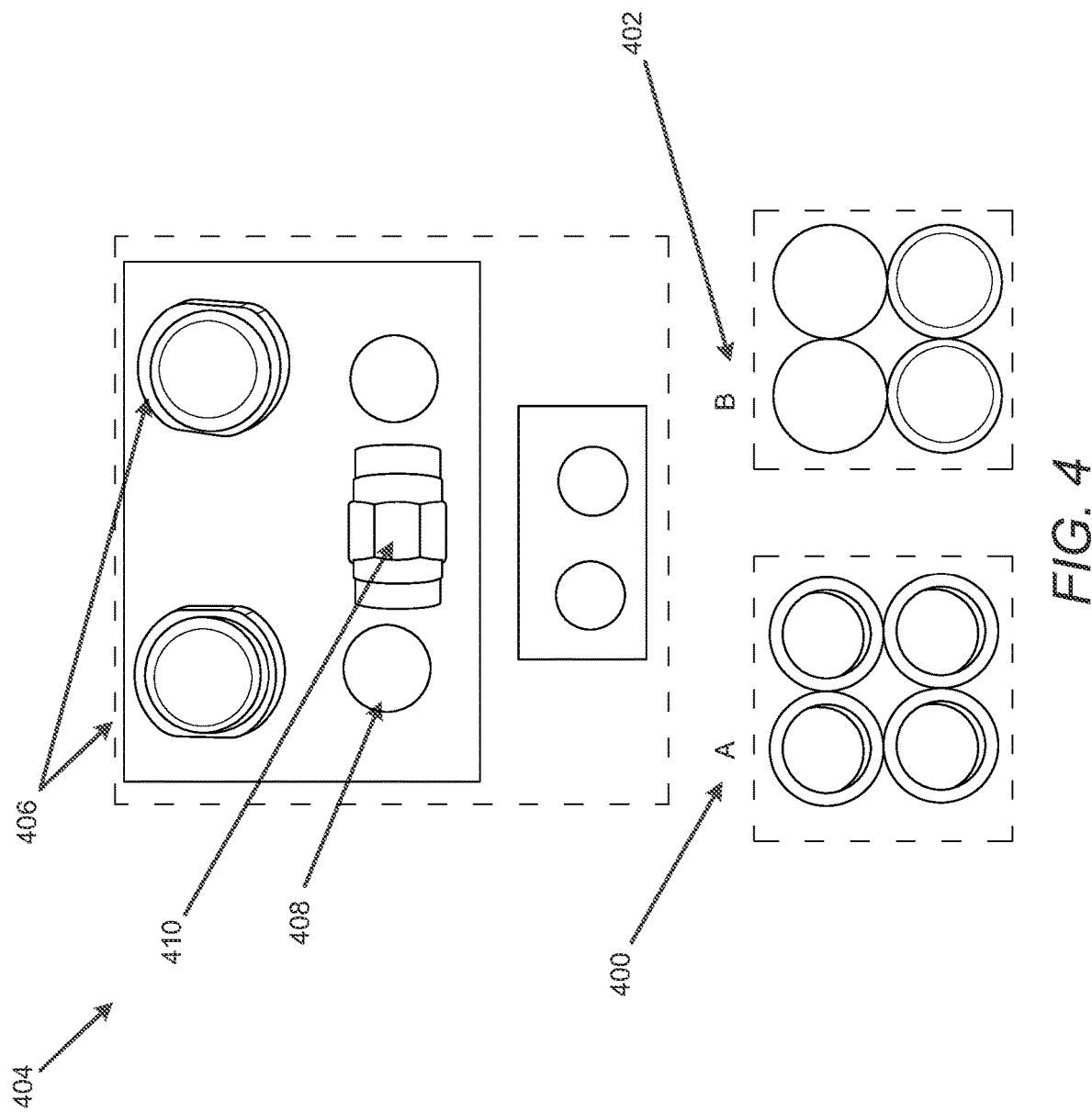
FIG. 4 illustrates views of column hardware, in accordance with an example of the present disclosure.

FIG. 4 illustrates views of column hardware 404, in accordance with an example of the present disclosure.

Referring to FIG. 4, the column hardware 404 may include two examples of flow distributors and PEEK cap assemblies with integrated frit as shown at 400 and 402. The flow distributors and PEEK cap assemblies with integrated frit 400 may be utilized for open dispersion column systems. The flow distributors and PEEK cap assemblies with integrated frit 402 may be utilized for external dispersion column systems. The column hardware 404 may include two end nuts 406, two press in frits 408, and one tube 410.

Figure 5:
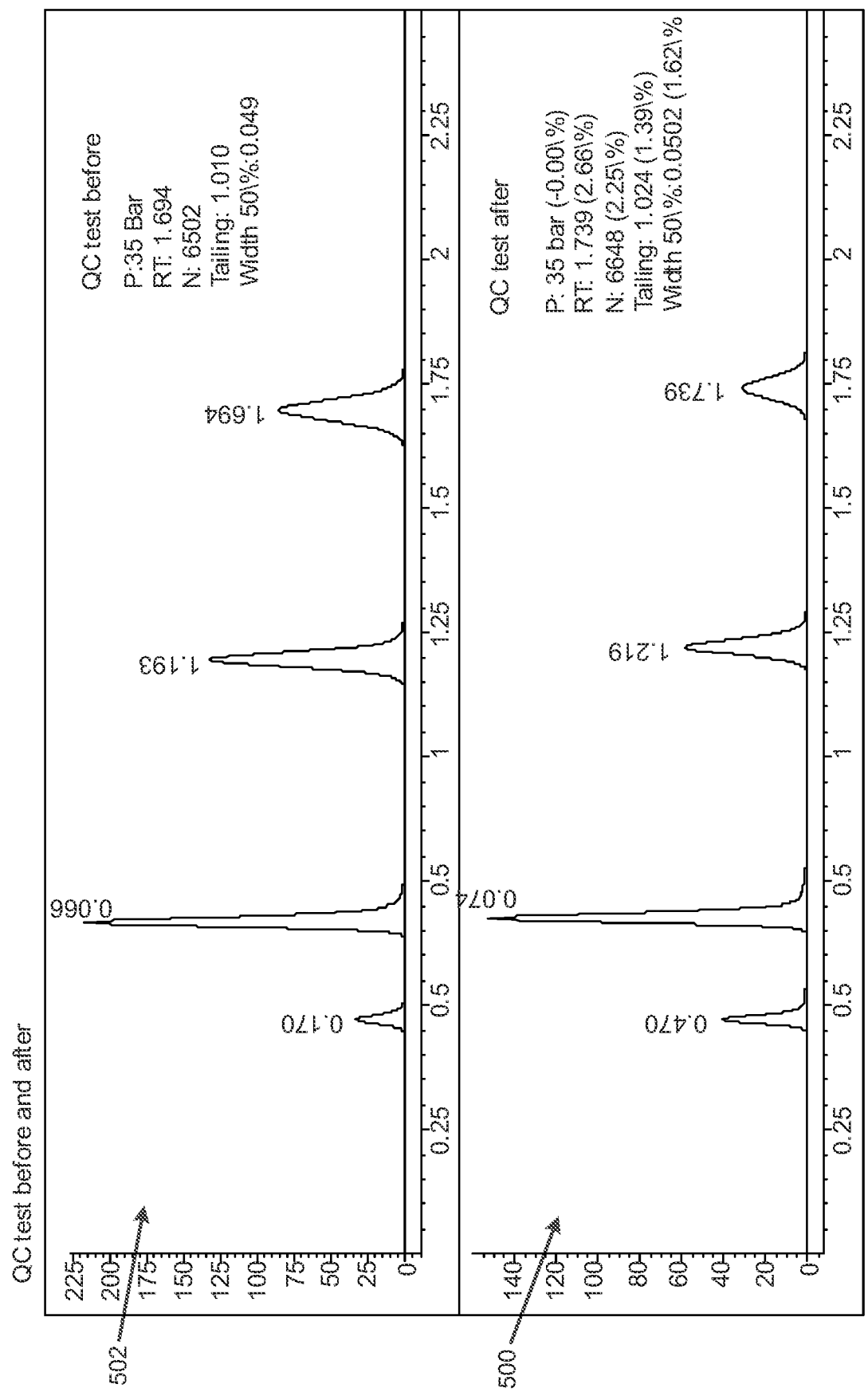
FIG. 5 illustrates quality control (QC) test results before and after stress test and lifetime test for the HPLC column loaded by means of the load adapter of FIGS. 1A and 1B, in accordance with an example of the present disclosure.

FIG. 5 illustrates quality control (QC) test results before and after stress test and lifetime test for the HPLC column loaded by means of the load adapter 100, in accordance with an example of the present disclosure.

Referring to FIG. 5, stress test and lifetime test for the load adapter 100 at 500 shows improved QC test results compared to the plot at 502. In this regard, for the QC test, efficiency (e.g., half height) and peak shape (e.g., tailing) for naphthalene (peak 4) may be monitored.

Figure 6:
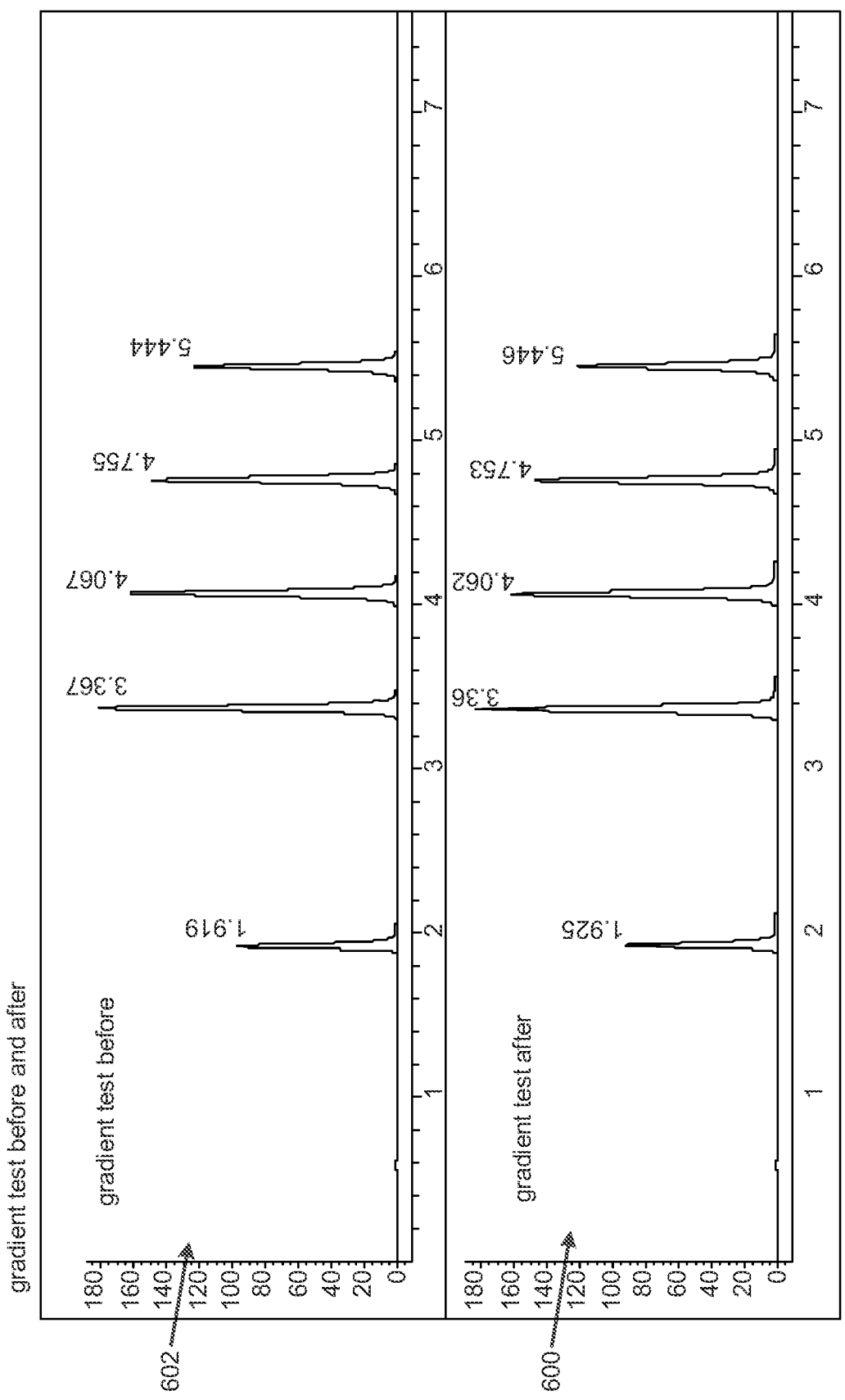
FIG. 6 illustrates gradient test results before and after stress test and lifetime test utilization of the HPLC column loaded by means of the load adapter of FIGS. 1A and 1B, in accordance with an example of the present disclosure.

FIG. 6 illustrates gradient test results before and after stress test and lifetime test utilization of the HPLC column loaded by means of the load adapter 100, in accordance with an example of the present disclosure.

Referring to FIG. 6, stress test and lifetime test of the load adapter 100 at 600 shows improved gradient test results compared to the plot at 602. Further, for fully porous (as well as for superficially porous) media prep columns the load adapter 100 may provide a higher impact in lifetime compared to peak shape and efficiency. With respect to the gradient test, for (semi) prep HPLC columns, a tailing may be present on the baseline level. This tailing may be denoted footing as the tailing values do not measure below 5% peak height. In this regard, statistical plates may be utilized as a measure for the footing, particularly while reporting half height plates beside it. For a high efficient peak, both values may be high, and the value determined by dividing statistical plates by half height plates may be >>60%, such as, for example, 80%.

Figure 7B:
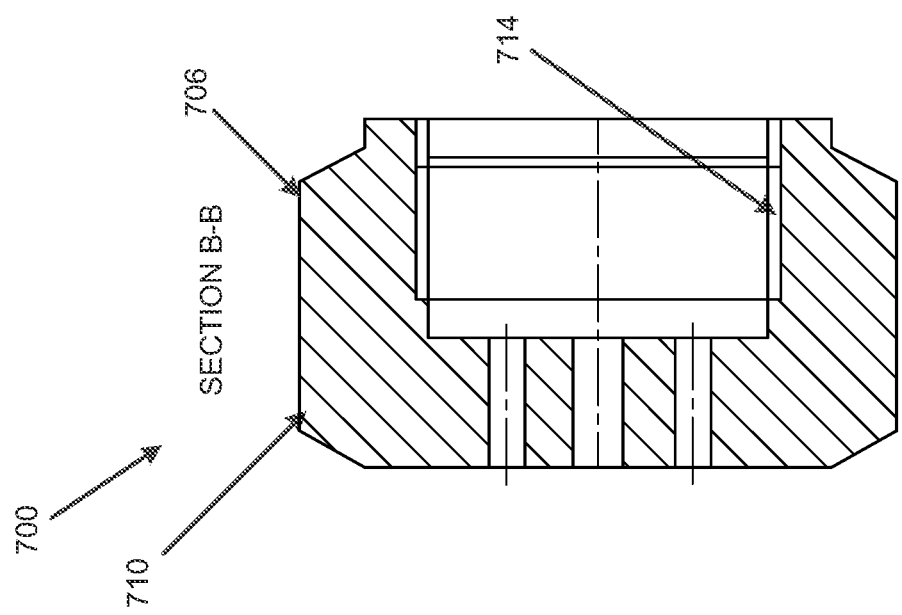
FIGS. 7A and 7B respectively illustrate a front view of a third embodiment of a load adapter, and a side sectional view taken generally along section B-B of FIG. 7A, in accordance with an example of the present disclosure.
Figure 7A:
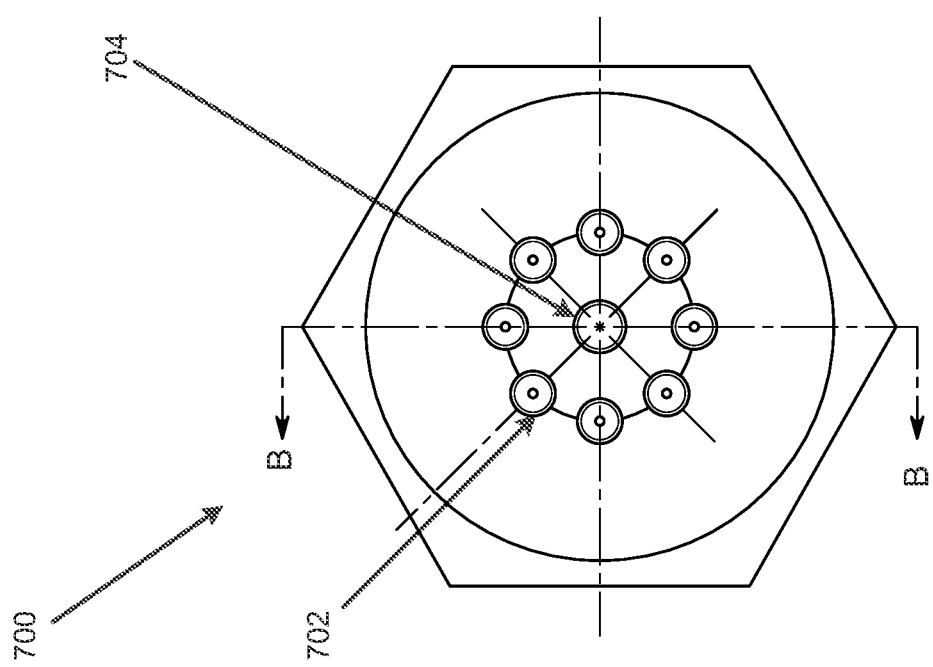

FIGS. 7A and 7B respectively illustrate a front view of a third embodiment of a load adapter 700, and a side sectional view taken generally along section B-B of FIG. 7A, in accordance with an example of the present disclosure.

Referring to FIG. 7A, the load adapter 700 may include, as shown, a body 710 including an inlet passage 714 that is in fluid communication with at least one outlet hole 702 (also referred to herein as holes 702). The at least one outlet hole 702 may be disposed relative to a central hole 704. In the example of FIG. 7A, the load adapter 700 may include eight holes 702. However, as disclosed herein, the load adapter 700 may include a single hole or any number of holes that provide on the order of a 5% to 90% opening area to prevent the load adapter from being a restriction in a flow path during initial stages of loading a column.

Compared to the load adapters 100 and 210, for the load adapter 700, the inlet passage 714 may be at least partially formed as shown within the body 710.

The load adapter 700 may further include a side wall 706 including a plurality of flat portions 708. The flat portions 708 may be utilized, for example, for alignment, installation, and other such purposes for the load adapter 700.

Figure 8B:
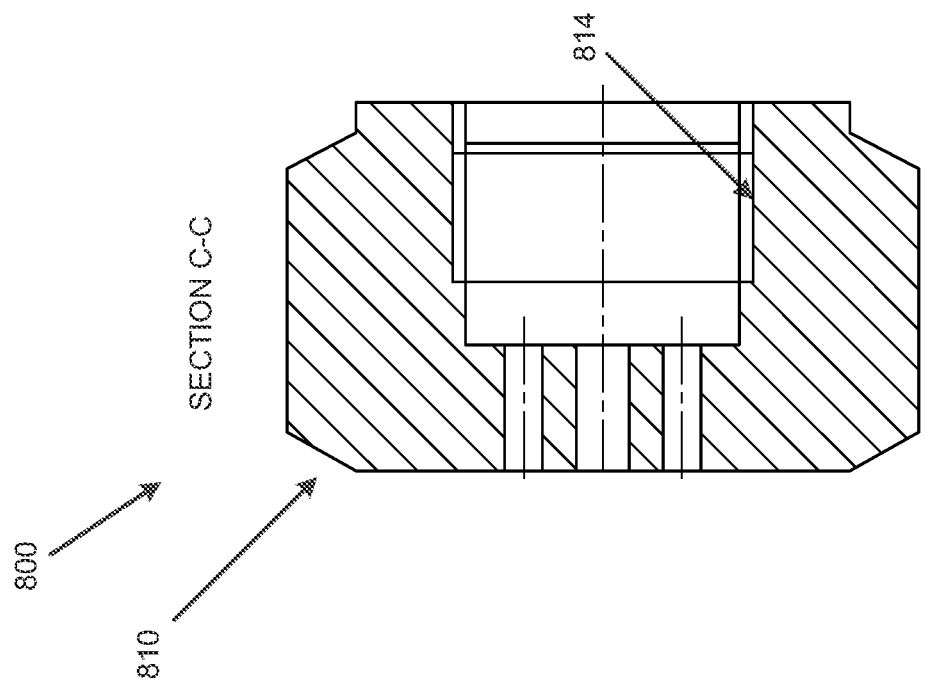
FIGS. 8A and 8B respectively illustrate a front view of a fourth embodiment of a load adapter, and a side sectional view taken generally along section C-C of FIG. 8A, in accordance with an example of the present disclosure.
Figure 8A:
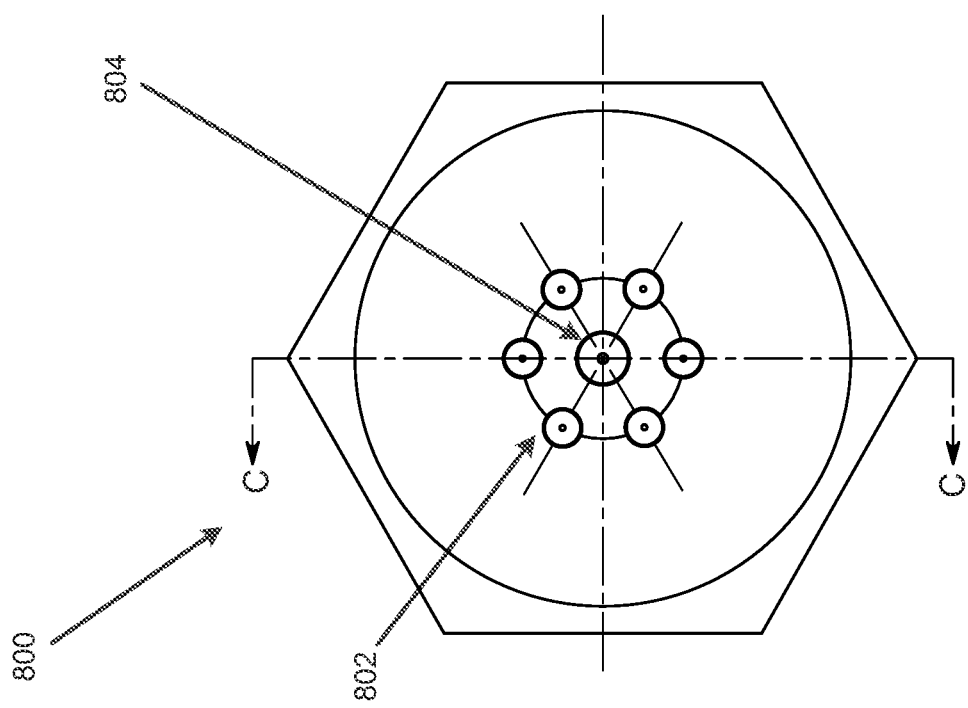

FIGS. 8A and 8B respectively illustrate a front view of a fourth embodiment of a load adapter 800, and a side sectional view taken generally along section C-C of FIG. 8A, in accordance with an example of the present disclosure.

Referring to FIG. 8A, the load adapter 800 may include, as shown, a body 810 including an inlet passage 814 that is in fluid communication with at least one outlet hole 802 (also referred to herein as holes 802). The at least one outlet hole 802 may be disposed relative to a central hole 804. In the example of FIG. 8A, the load adapter 800 may include six holes 802. However, as disclosed herein, the load adapter 800 may include a single hole or any number of holes that provide on the order of a 5% to 90% opening area to prevent the load adapter from being a restriction in a flow path during initial stages of loading a column.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A load adapter comprising:
   a body including an elongated shaft that includes an inlet passage that is in fluid communication with at least one outlet hole,
   wherein the at least one outlet hole is dimensioned to provide an opening area that is between approximately 5% to approximately 90% of a face of the body,
   wherein the at least one outlet hole includes a central hole and a plurality of holes disposed in a circular pattern around the central hole,
   wherein the central hole is at least partially internally threaded, and
   wherein the plurality of holes disposed in the circular pattern around the central hole is non-threaded.

2. The load adapter according to claim 1, wherein the at least one outlet hole includes seven holes that include the central hole and six holes disposed in the circular pattern around the central hole.

3. The load adapter according to claim 1, wherein the at least one outlet hole includes a further plurality of holes disposed in a further circular pattern around the plurality of holes disposed in the circular pattern around the central hole.

4. The load adapter according to claim 1, further comprising:
   a plug insertable within the load adapter to close the at least one outlet hole.

5. The load adapter according to claim 4, wherein the plug includes at least one complementary protrusion that is insertable in the at least one outlet hole to close the at least one outlet hole.

6. The load adapter according to claim 1, wherein the face of the body includes a recessed portion that includes the at least one outlet hole.

7. The load adapter according to claim 1, further comprising:
   a circular side wall including at least one flat portion.

8. A load adapter comprising:
   a body including an inlet passage that is in fluid communication with at least one outlet hole,
   wherein the at least one outlet hole is dimensioned to provide an opening area that is between approximately 5% to approximately 90% of a face of the body,
   wherein the face of the body includes a recessed portion that surrounds the at least one outlet hole that contacts and exits through a face of the recessed portion, and
   wherein the recessed portion includes a diameter that is greater than a diameter of the at least one outlet hole.

9. The load adapter according to claim 8, wherein the inlet passage is partially formed within the body.

10. The load adapter according to claim 8, wherein the at least one outlet hole includes a central hole and a plurality of holes disposed in a circular pattern around the central hole.

11. The load adapter according to claim 8, further comprising:
   a plug insertable within the load adapter to close the at least one outlet hole.

12. The load adapter according to claim 11, wherein the plug includes at least one complementary protrusion that is insertable in the at least one outlet hole to close the at least one outlet hole.

13. The load adapter according to claim 8, further comprising:
   a side wall including a plurality of flat portions.

14. A plug comprising:
   a body including a plurality of protrusions that are insertable in complementary outlet holes of a load adapter to close the outlet holes,
   wherein the protrusions are sized, upon insertion into the outlet holes, to close the outlet holes to prevent passage of fluid from the outlet holes.

15. The plug according to claim 14,
   wherein the body includes a first diameter portion including the protrusions, and a second diameter portion extending from the first diameter portion, and
   wherein a diameter of the second diameter portion is less than a diameter of the first diameter portion.

16. The plug according to claim 14, wherein the protrusions include a central protrusion and a plurality of non-central protrusions disposed in a circular pattern around the central protrusion.

17. The plug according to claim 16, wherein the protrusions include a plurality of further protrusions disposed in a further circular pattern around the non-central protrusions.

18. The plug according to claim 14, wherein the protrusions are dimensioned to provide a closing area that is between approximately 5% to approximately 90% of a face of the body.

\* \* \* \* \*